(12) United States Patent  (10) Patent No.: US 7,661,634 B2
Thompson  (45) Date of Patent: Feb. 16, 2010

(54) KEYED CHANNEL STRUT MOUNTED CONNECTOR DEVICE

(75) Inventor: Alvin Dean Thompson, St. Joseph, MO (US)

(73) Assignee: DT Search & Designs, LLC, St. Joseph, MO (US)

(*) Notice: Subject to any disclaimer, the term of this patent is extended or adjusted under 35 U.S.C. 154(b) by 314 days.

(21) Appl. No.: 11/645,874

(22) Filed: Dec. 27, 2006

(65) Prior Publication Data

US 2007/0101551 A1 May 10, 2007

Related U.S. Application Data

(63) Continuation-in-part of application No. 11/496,696, filed on Jul. 31, 2006, now abandoned, which is a continuation-in-part of application No. 10/359,867, filed on Feb. 7, 2003, now Pat. No. 7,107,653.

(60) Provisional application No. 60/355,430, filed on Feb. 8, 2002.

(51) Int. Cl.
*F16L 3/14* (2006.01)

(52) U.S. Cl. .................... 248/74.3; 24/274 R; 24/618; 248/72; 248/73

(58) Field of Classification Search .................. None
See application file for complete search history.

(56) References Cited

U.S. PATENT DOCUMENTS

| | | | |
|---|---|---|---|
| 712,765 A | 11/1902 | Cole | |
| 2,881,762 A | 4/1959 | Lowrie | |
| 3,161,210 A | 12/1964 | Loof | |
| 3,650,499 A * | 3/1972 | Biggane | .................. 248/62 |
| 3,837,047 A * | 9/1974 | Bunnell | .................. 24/16 PB |
| 3,925,851 A | 12/1975 | Bevans | |
| 4,183,120 A | 1/1980 | Thorne | |
| 4,305,179 A | 12/1981 | Sakurada | |
| 4,371,137 A | 2/1983 | Anscher | |
| 4,372,011 A | 2/1983 | Aranyos | |
| 4,502,186 A | 3/1985 | Clarke et al. | |
| 4,557,024 A | 12/1985 | Roberts et al. | |
| 4,695,019 A | 9/1987 | Lindberg et al. | |
| 4,881,301 A | 11/1989 | Sweeney et al. | |
| 4,930,192 A | 6/1990 | Muhr | |
| 4,935,992 A | 6/1990 | Due | |
| 4,961,553 A | 10/1990 | Todd | |
| 5,133,523 A | 7/1992 | Daigle et al. | |

(Continued)

*Primary Examiner*—Jack W. Lavinder
(74) *Attorney, Agent, or Firm*—Polsinelli Shughart PC; Marcia J. Rodgers

(57) ABSTRACT

A keyed channel strut mounted connector device includes channel engagement structure connected to attachment structure. The channel engagement structure includes a key for engaging the channel, and an octagonal neck connecting the key to a boss surmounting the attachment structure. The neck includes clearance facets permitting the key to pass into the longitudinal channel, and relief facets defining support shoulders on the key for supporting the key on the inwardly turned sidewalls of a channel strut. Two pairs of opposed support shoulders permit installation of the device for supporting a run of cables or pipes parallel with the longitudinal axis of the strut, or rotation of the device 90° for supporting the cables or pipes transverse to the strut. By rotating the device 180° in either direction, the head and tail ends of the attachment structure can be reversed without changing the parallel or transverse orientation of the attachment structure.

21 Claims, 5 Drawing Sheets

U.S. PATENT DOCUMENTS

| | | |
|---|---|---|
| 5,216,784 A | 6/1993 | Dyer |
| 5,251,857 A * | 10/1993 | Grice et al. .................. 248/62 |
| 5,354,021 A | 10/1994 | Farrell |
| 5,411,356 A | 5/1995 | Travis et al. |
| 5,806,819 A | 9/1998 | Martone |
| 5,819,376 A | 10/1998 | Kovalsky et al. |
| 5,855,044 A | 1/1999 | Cradduck |
| 6,536,719 B2 | 3/2003 | Rivera |

\* cited by examiner

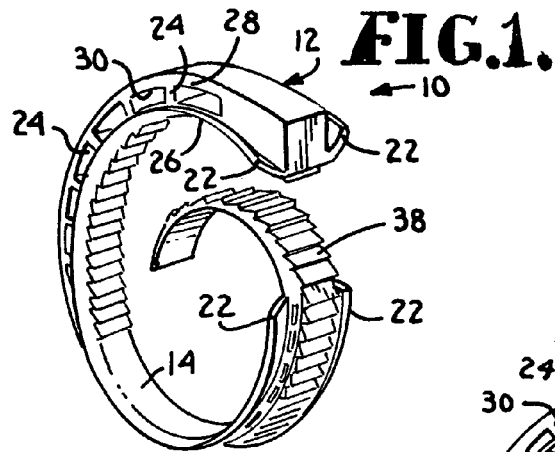
FIG. 1.
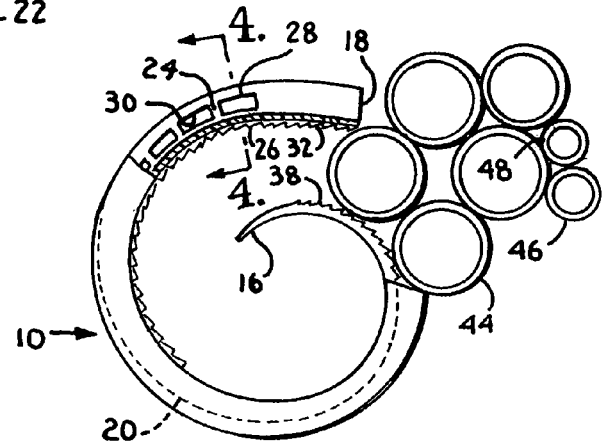
FIG. 2.
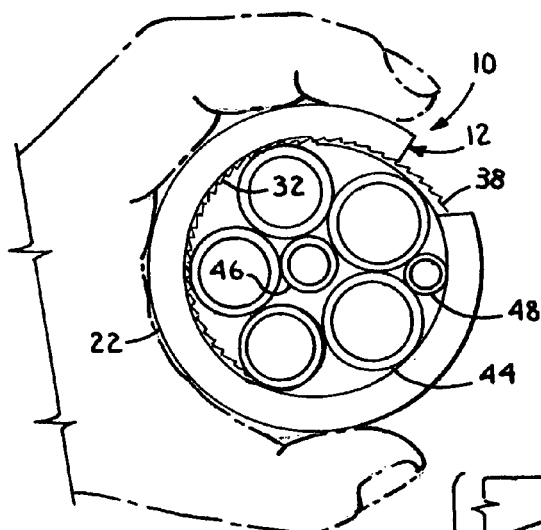
FIG. 3.
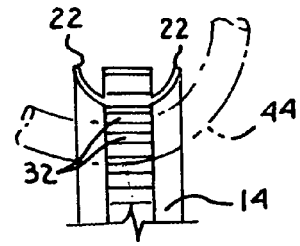
FIG. 4.
FIG. 5.

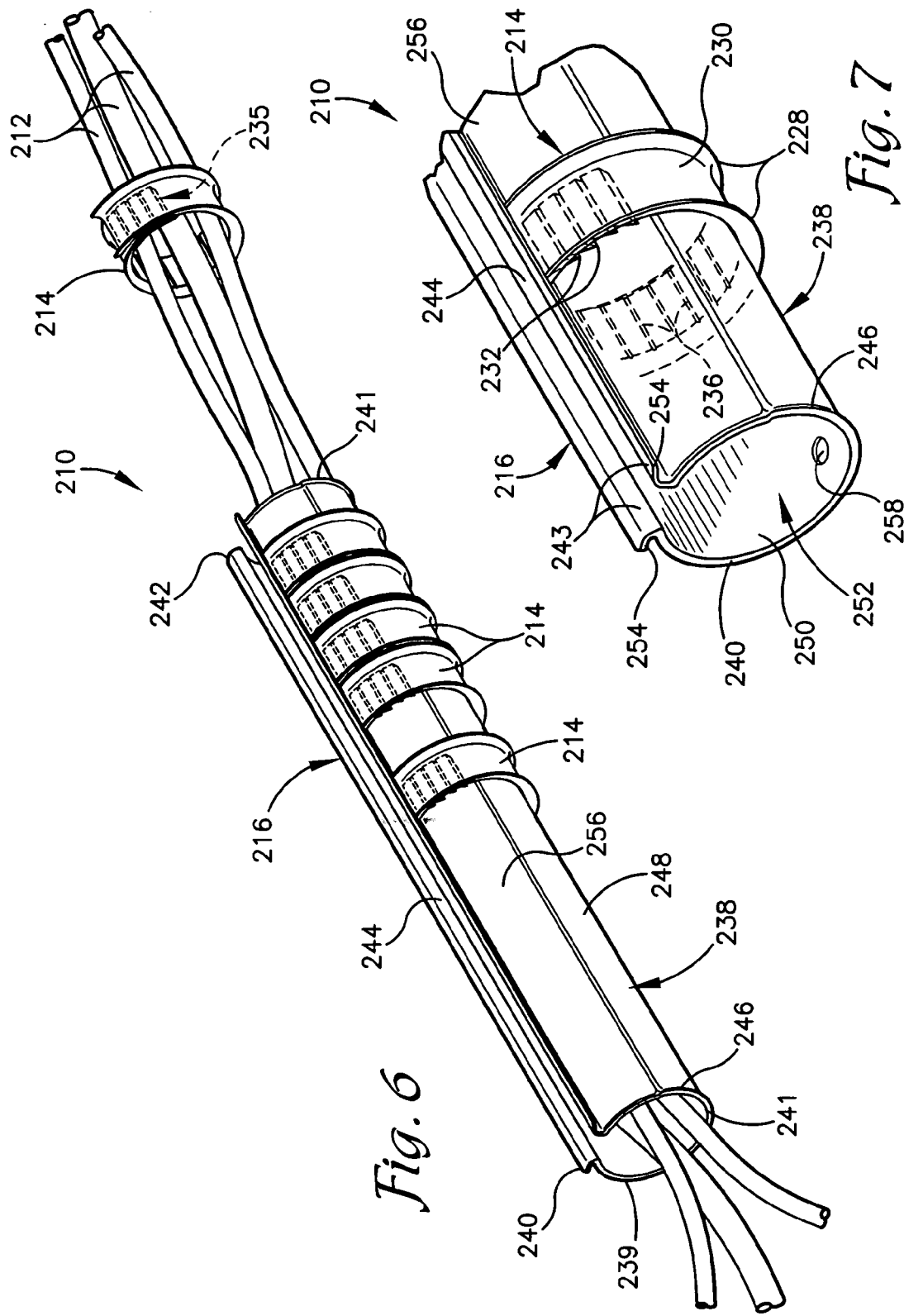

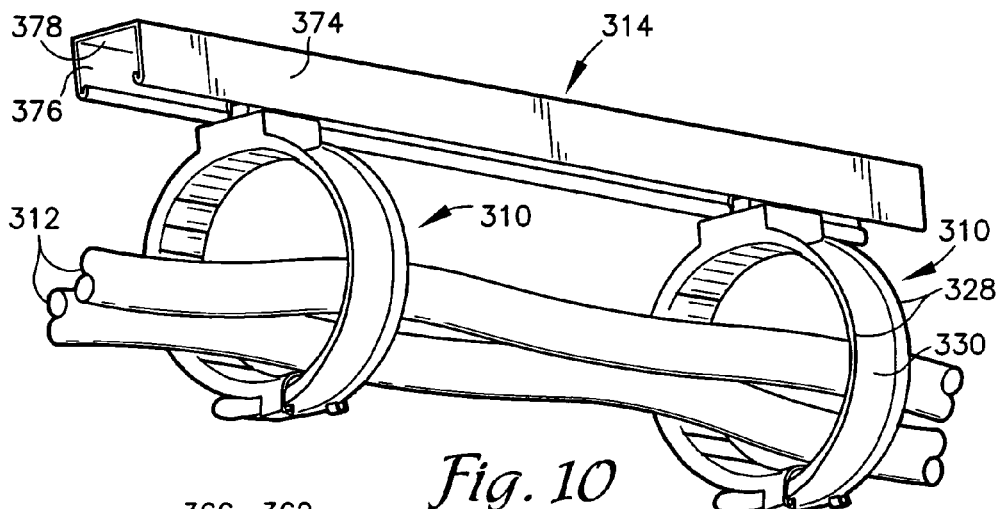
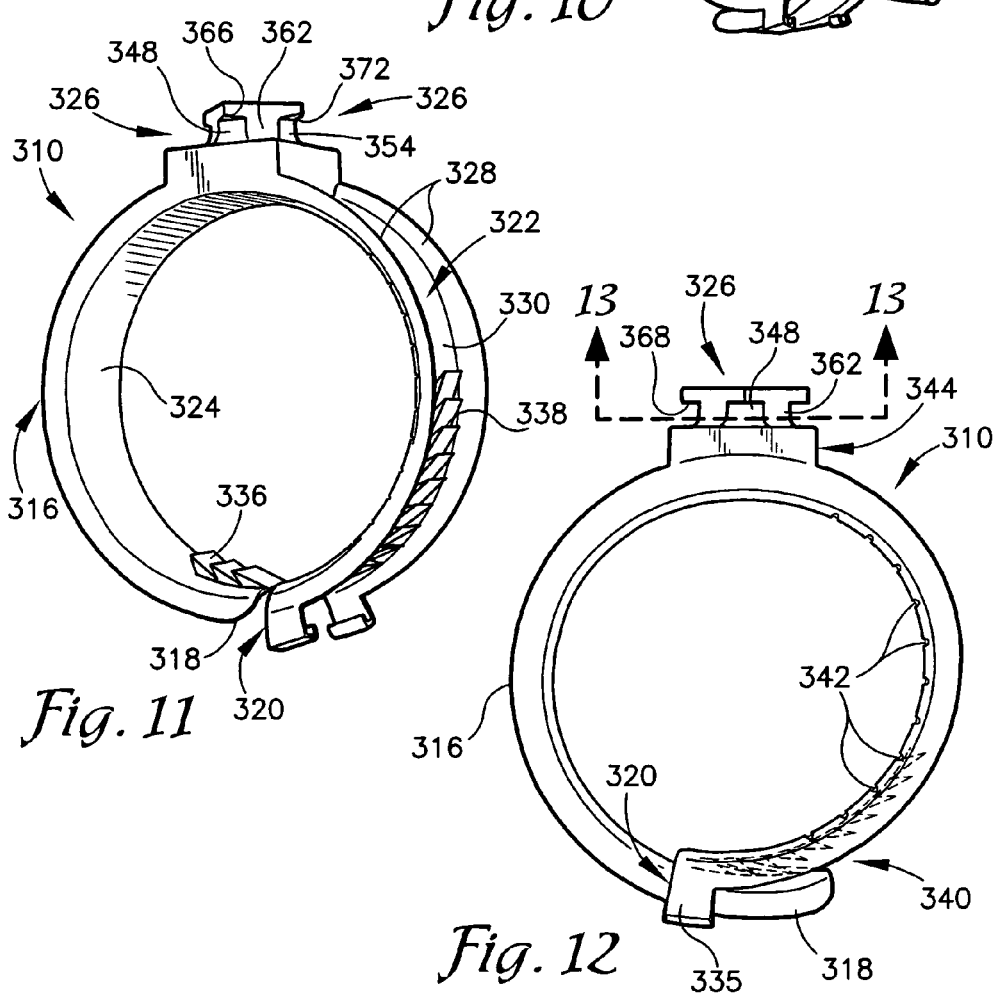

KEYED CHANNEL STRUT MOUNTED CONNECTOR DEVICE

CROSS-REFERENCE TO RELATED APPLICATION

This application is a continuation-in-part of U.S. patent application Ser. No. 11/496,696 entitled CABLE RETENTION SYSTEM filed Jul. 31, 2006 now abandoned, which is a continuation-in-part of U.S. patent application Ser. No. 10/359,867 entitled CABLE RETENTION DEVICE filed Feb. 7, 2003, now U.S. Pat. No. 7,107,653, which is based on Provisional Application Ser. No. 60/355,430 entitled CABLE RETENTION DEVICE filed on Feb. 8, 2002.

BACKGROUND

Restraining devices are broadly described herein, more particularly a tie for securing one or more objects such as cables, wires or conduits in a bundle or to another object.

Existing cable ties take several forms. The most elementary example is a wire which is either bare or is coated with insulation and which is twisted around one or more cables which it is desired to bundle together. A more popular cable tie which is now used is a preformed plastic strip having teeth which pass through a catch box, where the teeth engage a complemental restraint which locks the end of the tie in place.

The disadvantages of the prior art devices described above are several. First, with many types of cable, especially low voltage computer cables, the cable is sensitive to binding and it is frequently the case that the cable tie is tightened too tightly so that it adversely affects the performance of the equipment being fed by the cable. If an uncoated wire is utilized as the tie, significant damage to the cable or cables being secured may result.

Flexible conduits such as hoses and tubing are similarly sensitive to binding. Their lumens may become narrowed or partially occluded if a cable tie is overtightened, diminishing the rate of flow of liquid or gasses carried by the conduits.

Another disadvantage of the prior art, even when utilizing the more popular plastic cable ties described above, is that there is no way to judge when the tie is properly secured. Since there is no margin for error, the tie may be too tight and may adversely affect performance without the knowledge of the installer who applied the tie.

Another disadvantage of prior art ties is that once they are tightened, they cannot be released without use of a cutting tool, which destroys the tie.

Another disadvantage of prior art ties is that, even when installed properly so as not to bind the cable during normal use, if the cable is bent around a corner there is the possibility that of the cable becoming pinched and adversely affected, even though this was not the case when the cable was laid out in a straight line.

Still another disadvantage of prior art tie constructions is that for the most part they require two hands to bring the cable tie around the cable and secure it to other cables in the bundle or to another object.

Elongated members such as cables or piping are often supported in building areas such as plenums by elongated channel structures, often referred to as channel struts. A length of channel strut is typically formed by a web, flanges extending from side edges of the web, and inwardly directed rims along outer edges of the flanges. The rims form shoulders. Hanger devices are engaged with the shoulders at any needed locations along the strut to support the cable or pipe.

Existing hanger structure for use with channel struts generally requires fasteners such as screws or, alternatively, they may require special tools for installation. The installation of such hanger structure is time consuming and they often cannot be easily repositioned. Moreover, such structure is typically designed for mounting in a single orientation, so that the cables are strung in either the longitudinal direction of the support or transverse to the direction of the support, but they are not shiftable between the two.

Examples of devices that include a rectangular nut with a threaded central bore for receiving a fastener include U.S. Pat. No. 5,411,356 issued to Travis et al., U.S. Pat. No. 5,251,857 issued to Grice et al. and U.S. Pat. No. 5,133,523 issued to Daigle et al. In these devices, the rectangular nut is sized for reception within the channel when the elongate sides of the nut are positioned in line with the channel. The rectangular nut must then be rotated 90° to position the elongate sides of the nut perpendicular to the channel so that the device will be supported on the inwardly turned sidewalls of the strut.

SUMMARY

The present keyed channel strut mounted connector device overcomes the disadvantages of the prior art by providing an attachment structure fixedly connected to channel engagement structure. The channel engagement structure includes a key plate for engaging the channel, the plate being connected to a neck that is in turn connected to a boss surmounting the support member. The neck includes clearance facets that permit the key plate to pass through the longitudinal opening in a channel strut, and relief facets that define support shoulders on the key plate for supporting the key on the inwardly turned sidewalls of a channel strut. Because the key plate includes two pairs of opposed support shoulders, the device can be installed for supporting a run of cables parallel with the longitudinal axis of the strut, or it can be rotated 90° for supporting the cables or pipes in transverse relation to the strut. The device can also be rotated 180° in either direction, permitting the head and tail ends of the cable tie to be reversed without changing the parallel or transverse orientation of the tie.

Various objects and advantages of this device will become apparent from the following description taken in conjunction with the accompanying drawings wherein are set forth, by way of illustration and example, certain embodiments of this device.

The drawings constitute a part of this specification, include exemplary embodiments of the present device, and illustrate various objects and features thereof.

BRIEF DESCRIPTION OF THE DRAWINGS

FIG. 1 is a perspective view of an exemplary cable tie.

FIG. 2 is a side elevational view, with portions cut away and shown in cross section as the cable tie is moved into position to hold a bundle of cables.

FIG. 3 is a side elevational view of the cable tie held between the thumb and forefinger of one hand of a user and locked into position using only the one hand shown.

FIG. 4 is a fragmentary cross-sectional view of the cable tie taken along line 4-4 of FIG. 2 and illustrating the manner in which a cable may be bent around it with out damage to the cable.

FIG. 5 is a greatly enlarged exploded side elevational view of the interchangeable teeth and body portions of the cable tie.

FIG. 6 is a perspective view of a cable tie retention system including an alternate embodiment of a cable tie shown in association with a storage and installation tool.

FIG. 7 is an enlarged fragmentary view of a portion of the system with a cable tie positioned on the tool as shown in FIG. 6.

FIG. 10 is a perspective view of an exemplary embodiment of a keyed channel strut mounted connector device positioned in a channel strut.

FIG. 11 is a perspective view of the connector device shown in FIG. 10, showing the ends of the tie in an open, cable accepting position.

FIG. 12 is a side elevational view of the cable tie shown in FIG. 11, with the ends shown in a closed, locked position.

DETAILED DESCRIPTION

Figure 8:
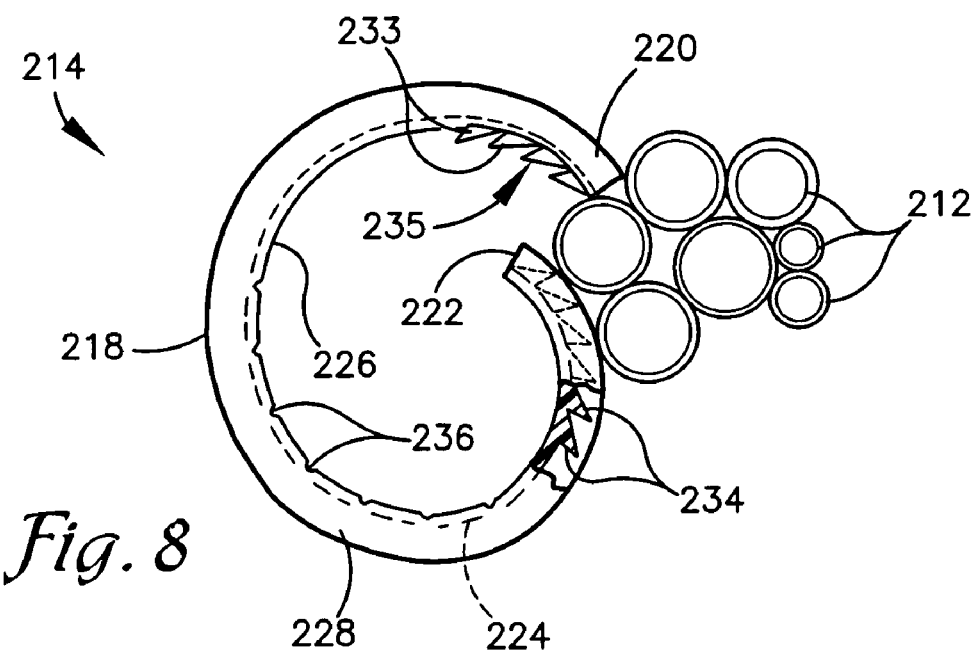
FIG. 8 is a side elevational view of the cable ties shown in FIG. 6, with the ends shown moving into position to accept a bundle of cables.

As required, detailed embodiments are disclosed in this application; however, it is to be understood that the disclosed embodiments are merely exemplary and that the keyed channel strut mounted connector device may be embodied in various forms. Therefore, specific structural and functional details disclosed herein are not to be interpreted as limiting, but merely as a basis for the claims and as a representative basis for teaching one skilled in the art to variously employ the device in virtually any appropriately detailed structure.

Referring initially to FIG. 1, a cable tie device is designated generally by the numeral 10. Cable tie 10 comprises an annular support 12 of generally rectangular cross section and a generally convex inner face 14, which is integrally formed with annular support 12 around its circumference. The cross sectional area of the support 12 decreases significantly from one end to the other. It is desirable that the cross sectional area of the terminal end designated by the numeral 16 in FIG. 2 be 20 to 25 percent of the area of the opposite terminal end 18 (see FIG. 2). The gradually decreasing dimension of annular support 12 is indicated by broken line 20 in FIG. 2. It is also to be noted that portions of convex inner face 14 are formed by wings 22 which are integral with and project outwardly from support 12.

The construction of annular support 12 is further defined by a honeycomb structure comprising a plurality of spaced apart cross members 24 and a relatively flat planar section 26 (FIG. 1) which is parallel to a second planar section 28 which presents the outer surface of support 12. The two planar sections 26 and 28 are spaced apart to provide an open area 30 that completes the "honeycomb" effect. Of course, other cushioning structure could be employed between the planar sections 26 and 28 so that the section 26 will yield under force. It is to be understood that a first annular portion of support 12, extending over an area of approximately 180° is relatively rigid and inflexible. A second annular portion of support 12, extending over approximately 180° is relatively flexible and is formed so that it has a degree of built in memory which will cause it to be biased outwardly in the general direction of the first annular portion while still being yieldable to allow an object such as one or more cables to move past it. This characteristic of the second annular portion of support 12 will be a function of the particular resinous elastomeric material utilized and the cross sectional area of the second annular portion in comparison to the first annular portion. These parameters are well within the scope of knowledge of one skilled in the art.

Disposed on the inner surface of convex inner face 14 are a plurality of teeth 32 the configuration of which is best shown in FIG. 5. Each tooth 32 comprises a curvilinear surface 34 which terminates in a groove 36.

Complemental teeth 38 are formed along the outer surface of the second annular portion of support 12 as it approaches terminal end 16. Teeth 38 are presented by curvilinear surface 40, which mates with surface 34 and projection 42, which mates with groove 36.

A plurality of cables 44, 46 and 48 are shown in FIG. 2. Cable tie 10 may be moved into position to bundle the cables by holding it between the thumb and forefinger as shown in FIG. 3. This compresses the support 10 and provides an opening for insertion of the cables. The cables are moved to the interior of the band in the manner shown in FIG. 2. There is sufficient flexibility of the second annular portion of support 12 so that it will yield relative to the force of the cables being pushed against it. To this end, the relatively rigid nature of the first annular portion of support 12 facilitates movement of the cables 44-48 inside of the annulus formed by the support. Once the cable bundle is inside of the annulus as shown in FIG. 3, the ends 16 and 18 of tie 10 are moved toward each other so as to bring teeth 32 and 38 into complemental engagement. Once the user senses a reasonable amount of firm resistance to further movement of the ends of the tie, he or she may push with greater force to bring protrusions 42 into engagement with grooves 36 effecting the locking feature of the tie. Projections 42 are designed to snap in place with sufficient force so that the user can sense the engagement and know that locking has been achieved. The outward spring bias of the second half of support 12 helps to achieve positive locking action in a manner that minimizes any binding and without applying a tightening force to the cables beyond that needed to insert them into the device 10 and hold them in a bundled configuration. It is to be understood that various other locking means could be used instead of teeth 32-38, such as flexible pins, slots and grooves, and the like. One advantage of the device is that teeth 32 and 38 releasably engage so that the cable tie can be removed from the bundled cables without destroying it. This is a direct result of the use of the complemental teeth to achieve the locking action. The term "cable" as used herein encompasses any small diameter elongated objects such as wires, filaments and tubes.

It will be appreciated that the honeycomb construction of annular support 12 provides a degree of resiliency and flexibility to inner face 14 to provide further insurance against the cables being pinched and damaged even if the degree of closure of tie 10 is excessive.

Referring to FIG. 4, a cable 44 is shown bent at nearly a 90° angle relative to tie 10. Convex surface 14, in cooperation with wings 22, accommodates this angular orientation without binding the cable.

Figure 9:
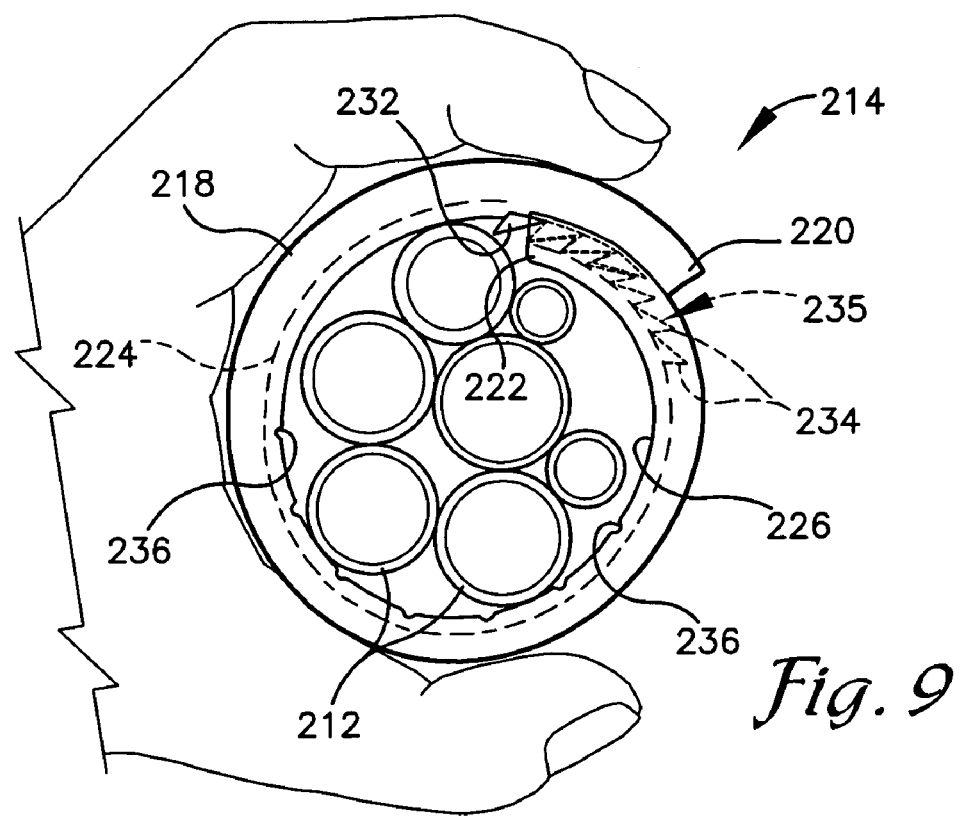
FIG. 9 is a side elevational view of the alternate cable tie of FIG. 6 installed in position surrounding a bundle of cables and being urged into a locking position by the thumb and forefinger of a user.

A cable retention system is generally designated by the reference numeral 210 and is depicted in FIGS. 6 and 7 in association with a plurality of cables 212 to be retained in a bundle. The cable retention system 210 includes a cable bundler or tie 214 and a storage and installation tool 216. The cable tie 214 includes an elongated annular band 218 having a first or head end 220 and a second or tail end 222, a generally convex outer surface 224 and a generally concave inner surface 226 (FIGS. 8-9). The lateral margins or edges of the band 218 are curled or flared radially outwardly to form a pair of upstanding rims 228 defining a channel 230 (FIG. 7). The rims 228 are somewhat analogous to the wings 22 of the cable tie 10 previously described and function to guide the head end 220 into overlapping relation to the tail end 222. Additionally, the curled rims 228 provide radiused edges to the band 218 to avoid digging into the surface of a cable 212 which is bent in close proximity to a tie 214, in a manner similar to that illustrated in FIG. 4.

As best shown in FIGS. 8 and 9, a portion of the inner surface 226 of the band 218 adjacent the head end 220 is equipped with a plurality of inwardly directed teeth 232. A portion of the outer surface 224 of the band adjacent the tail end 222 is equipped with a plurality of complemental outstanding teeth 234. The teeth 232 and 234 form band end engagement structure 235 and are generally triangular in shape when viewed in cross section, although it is foreseen that they may also be configured as depicted in FIG. 5 and previously described. The teeth are configured for projection directed away from the respective ends and surfaces 220 and 226 and 222 and 224, respectively. This construction enables the outer teeth 234 to function as a ratchet, with the complemental angular portions of the inner teeth 232 serving as pawls. The inner pawl teeth 232 slide over the outer ratchet teeth 234 when the band 218 is compressed between the thumb and forefinger of a user. Once engaged, the pawl teeth 232 catch in the complemental ratchet teeth 234, preventing backward slippage and loosening of the band.

The band 218 may be constructed of any flexible, shape-retaining material such as a synthetic resin, rubber, metal, fibrous or other material configured to place the ends 220 and 222 in spaced proximate relationship. The band 218 has a generally uniform thickness, except where there are projecting teeth 232 and 234. In order to impart increased flexibility to the tail end portion of the band, an area of the inner surface 226 of the band 218 is equipped with a series of circumferentially spaced axial or transverse grooves or slots 236, shown in FIGS. 8 and 9. The purpose for rendering the tail end 222 more flexible than the head end 220 is to facilitate one-handed engagement of the band 218 with the cables 212, as will be described below. The slots 236 are arrayed asymmetrically on the band 218 so that they are offset toward the tail end 222. The slots commence adjacent a center portion of the band at a first spaced distance from the inner teeth 232 and terminate at a second spaced distance from the tail end of the band 222. Since the purpose of the slots is to impart additional flexibility to the tail end 222 of the band, they are positioned so that the first spaced distance from the head end is greater than the second spaced distance from the tail end. Thus, if the band 218 were divided into head and tail half portions, there would be fewer slots on the head half portion than on the tail half portion of the band. It is also foreseen that the slots 236 may continue all the way to the tail end 222 in order to impart greater flexibility to the tail portion of the band 218.

While the slots 236 are depicted in FIGS. 8 and 9 in evenly spaced relation, the spacing between the slots 236 may be varied, with the slots on the tail portion of the band being spaced closer together, either consistently or in a gradually converging relation to the tail end 222. The slots 236 are also depicted as having a uniform, fairly narrow width and a relatively shallow depth in comparison with the overall thickness of the band 218. However either or both of the width and the depth of the slots may be varied in the slots as they approach the tail end 222 in order to achieve a preselected desired increased flexibility at the tail end 222 to permit overlap of the head end 220.

In use, the cable bundler or tie 214 is grasped between a thumb and finger of one hand of a user as generally shown in FIG. 9. In the standard sized devices as shown in FIG. 9, the thumb and finger may fit comfortably between the rims 228 to rest in the channel 230. In smaller devices, the thumb and forefinger rest astride the rims 228. While a user is most likely to employ the forefinger as shown, any other finger could also be used to oppose the thumb in grasping the device.

The user next positions the tie 214 so that the opening between the ends 220 and 222 is adjacent the cables 212 to be bundled (FIG. 8). The user next urges the tie 214 against the cables, causing the more flexible tail end 222 to deflect inwardly as shown in FIG. 8, enlarging the opening and permitting the cables to slide between the ends 220 and 222 and pass into the interior of the band 218. The user may also rotate the tie 214 slightly as it is urged against the cables 212, to facilitate this operation. In practice, and especially when large numbers of ties 214 are installed on a run of cables 212, the tie is positioned and urged against the cables in a continuous motion which causes the cables to pass quickly and smoothly into the interior of the band 218. Thus, the ties 214 can be efficiently slapped onto the cables 212 and quickly snapped into place to gather and secure the cables 212 in a one-handed operation.

Once the cables are encircled by the band 218 as shown in FIG. 9, the user squeezes the outer surface of the band 224 between the thumb and finger to close the tie, causing the head end 220 bearing the inner pawl teeth 232 to overlap the tail end 222 bearing the outer ratchet teeth 234 so that the teeth 232 and 234 matingly engage in a circumferential direction. The configuration of the engaged outstanding projecting teeth 232 and 234 and the shape-retaining characteristics of the band 218 cooperate to lock the band in place once it is in a closed position. The user may continue to exert circumferential pressure on the band 218 until it urges the encircled bundle of cables 212 into its most compact configuration with a selected degree of tightening force. Since the tie device includes no sharp edges, the inner surface of the band 226 may be snugged against a cable bundle 212 without damage, for example, to a flow of electrical current. In such snugged applications, the outward spring bias of the band 218 and the pressure of the cable bundle 212 against the inner surface 226 cooperatively serve to further reinforce the locking mechanism of the tie device 214. In addition to gathering the cables 212, the tie 214 may also encircle a fastener or part of a structural member (not shown) to locally secure the bundled cables 212 in place or a tag to identify the cables.

A user may unclasp the tie 214 for removal or to add additional cables 212 by squeezing as previously described to release the engaged teeth 232 and 234. Once the teeth are disengaged, the user releases pressure and permits the tail end 222 to slide away from the head end 220 to form an opening between the ends. Additional cables 212 may be added by urging the cables against the opening and, once the cables are encircled within the tie device 214, again squeezing to engage the ratchet and pawl teeth 234 and 232 to lock the device. If the tie is to be removed, once unclasped it can be rotated and easily pulled away from the cables for further reuse. Advantageously, the tie device may be installed, adjusted, released for addition of cables or removed entirely by a user in an entirely one-handed operation.

The cable retention system 210 also includes a storage and installation tool generally designated by the reference numeral 216 and designed for use in association with the one handed cable tie device 214 as depicted in FIGS. 6 and 7. The tool 216 is shown in FIGS. 6 and 7 to include an elongated tubular sleeve or tube 238 formed by a tube wall 239 circumferentially formed into a partially tubular shape having a first end 240 and a second end 242, formed by end edges 241 of the tube wall 239, with a longitudinal opening or slot 244 extending therebetween. Each of the ends 240 and 242 is flared radially outwardly to form a low tie retaining lip or rim 246.

The sleeve 238 has a generally convex outer surface 248 and a generally concave inner surface 250, defining a raceway 252 for receiving a plurality of cables 212. The edges 243 of the slot 244 are flared or curled outwardly and partially rolled over to form a pair of flanges or lips 254, thereby defining a somewhat omega-shaped cross section. Each lip 254 cooperates with the convex outer surface 248 to form an exterior channel for receiving the ends 220 and 222 of the cable ties 214, and function as stops to prevent the ties 214 from sliding circumferentially about the tool 216. The illustrated convex outer surface 248 adjacent one of the lips 254 is relieved to form an indent, channel or groove 256 sized to receive the cable tie inner teeth 232 adjacent the head ends 220 when the cable ties 214 are mounted on the tool. The tool 216 also includes a pair of apertures 258 adjacent each of the ends 240 and 242 for transport or storage using a hanger such as a nail, peg, hook, loop or any other suitable means.

The tool 216 may be constructed of any suitable synthetic resin, metal or fibrous material that has shape-retaining characteristics yet is flexible. The outer surface 248 should be sufficiently smooth to permit sliding passage of the cable ties 214 and the groove 256 should be sufficiently deep to permit reception of the pawl teeth 232 and sliding passage of the teeth therealong. The tool 216 may be constructed in a variety of lengths, with shorter lengths being more suitable for tight spaces, and longer lengths being more suitable for long runs of cable. The diameter of the tool 216 is sized for reception of a plurality of cable ties 214 of a size that is preselected to correspond to the number and diameters of the cables 212 to be bundled. The lips 254 and rims 246 are proportioned to the diameter so that they function to retain stored cable ties 214 in place on the tool 216 while permitting them to be easily pushed off the ends 240 and 242 during use.

While the cable ties 214 and tools 216 are each are depicted as having a generally open, annular configuration, those skilled in the art will appreciate that cable tie devices and tools may be constructed to form any suitable closed geometric configuration once fastened, including oblong and multilateral configurations and that any cable tie configuration having a pair of open ends is within the scope of this application.

In use, a supply of cable ties 214 may be preloaded on the tool 216 in side-by-side relation for storage and use as needed. The tool 216 may be loaded from either or both ends 240 and/or 242 with a plurality of cable ties 214 by sliding the ties over one of the rims 246 (FIG. 6). All the ties 214 should be in the same orientation with the inner teeth 232 received in the groove 256. Once loaded, the tool may be stored until needed by engaging one of the apertures 258 with a hanger. Similarly, the stored cable ties 214 and tool 216 may be transported by hanging, as from the belt of a user.

In a method of use, a user first positions the loaded tool 216 with the slot 244 aligned generally parallel to and facing a plurality of adjacent cables 212 to be bundled. The user next urges the slot 244 against the cables 212, which slide easily past the rolled lips 254 and into the interior raceway 252. The tool 216 is thus positioned in surrounding and gathering relation to a bundle of cables 212. The user next slides the tool 216 in a relatively forward direction along the length of the cable bundle until it is desirable to secure the bundle with a tie 214. The construction and manner of use of the tool 216 cooperatively serve to preposition and orient the stored cable ties 214 over a bundle of cables for convenient access and installation at selected locations along the cables 212.

The user then slides a cable tie 214 in a relatively rearward direction along the outer surface 248 of the sleeve 238 and slips it over the rim 246 and off the rearward end 242 of the tool 216. The user fastens the tie 214 using one hand as previously described. This can be accomplished while the user continues to shift the sleeve 238 forwardly, along the length of the cable bundle 212. When the supply of ties 214 is exhausted, the tool 216 may be removed by urging the sleeve 238 away from the cables until they slide out of the slot 244, and a new, fully loaded tool 216 may be installed as previously described.

In this manner, a supply of cable ties 214 may be shifted forwardly along the length of a run of cables 212, and the ties may be dropped off the rearward end 242 of the tool at preselected, spaced intervals and fastened using one hand, while the tool 234 is shifted forwardly using the other hand.

A keyed channel mounted support in accordance with the present application is generally designated by the reference numeral 310 and is depicted in FIG. 10 in association with a plurality of bundled pipes or cables 312. The device 310 is shown in FIGS. 10 and 15 mounted in suspended relation to a channel strut 314. The illustrated device 310 (FIGS. 10-15) includes attachment structure 311 such as a cable tie, formed by an elongated annular band 316 with a first or head end 318 and a second or tail end 320, a generally convex outer surface 322, a generally concave inner surface 324 and channel or slot engagement structure 326 surmounting a portion of the outer surface 322. While the channel engagement structure 326 is shown positioned approximately midway between the head and tail ends 318 and 320, it is foreseen that it may be positioned at any suitable location along the outer surface 322 of the band 316. It is also foreseen that the attachment structure 311 could be implemented as something other than the illustrated cable tie, such as, for example, a closed loop, a hook, or the like.

The longitudinal margins or edges of the band 316 are curled or flared radially outwardly to form a pair of upstanding rims 328 defining a channel 330 (FIGS. 10, 11 and 15). A pair of upstanding guides 332 (FIG. 15) are integrally coupled with respective rims 328 adjacent the tail end 320 of the band. The free end of each guide 332 is turned backwardly toward the channel 330 to form a groove or slot 334. The pair of spaced apart slots 334 collectively form a keeper 335 for slidably receiving the corresponding rims 328 of the opposed head end 318 of the band. The keeper 335 and the rims 328 serve to align and retain the head end 318 of the band in overlapping relation with the tail end 320 once they have been engaged. It is foreseen that the keeper 335 could alternatively be formed by a bar (not shown) extending between and connecting the guides 332.

As shown in FIGS. 11 and 12, a portion of the inner surface 324 of the band 316 adjacent the head end 318 is equipped with a plurality of inwardly directed pawl teeth 336, and a portion of the outer surface 322 of the band adjacent the tail end 320 is equipped with a plurality of complemental outstanding ratchet teeth 338. The pawl and ratchet teeth 336 and 338 form band end engagement structure 340 substantially as previously described with reference to the cable tie device 214, except that the guides 332 cooperate with the band engagement structure 340 and serve to align and retain the rims 328 in close approximation. This in turn serves to align the complemental teeth 336 and 338 as the inner pawl teeth 336 slide over the outer ratchet teeth 338 and to retain the teeth in engaged relation, preventing backward slippage and loosening of the band 316.

The band 316 may also include a series of circumferentially spaced axial or transverse grooves or slots 342 that extends from an area near the center portion of the band 316, depicted in FIG. 12 as approximately adjacent the channel engagement structure 326, and terminates at a distance spaced from the tail end of the band 320, substantially as previously described.

Figure 13:
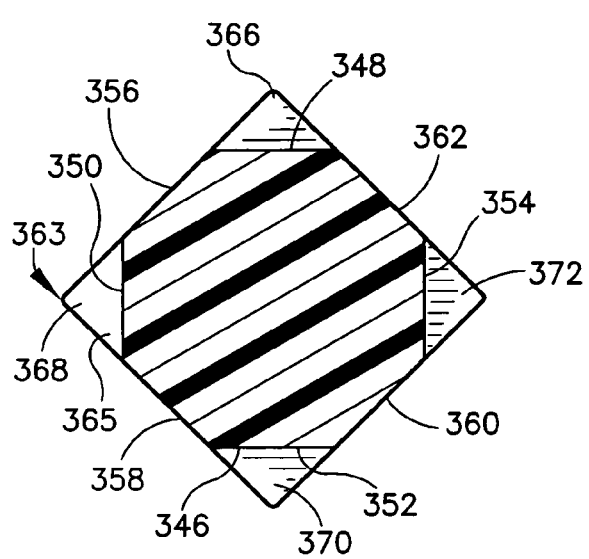
FIG. 13 is a sectional view taken along line 13-13 of FIG. 12 and showing a diamond key plate and octagon neck.

As shown in FIGS. 11-14 the channel engagement structure or key 326 includes a boss 344 that surmounts the outer surface 322 of the band 316, extending outwardly beyond the band channel 330 and rims 328. When viewed from above (FIG. 14), the boss 344 has a generally square configuration, although it may also be polyhedral, with equal or unequal sides, such as for example, lozenge shaped, or it may have a curvate configuration, such as circular, oval, cloverleaf, or it may have any other suitable shape. The boss 344 in turn is surmounted by a stem or neck 346. The neck 346 is shown in FIG. 13 to have a generally octagonal configuration when viewed in cross section. The neck 346 includes eight generally planar radial facets: four relief facets or grooves 348, 350, 352, 354 alternating with four relief clearance facets 356, 358, 360, 362.

Figure 14:
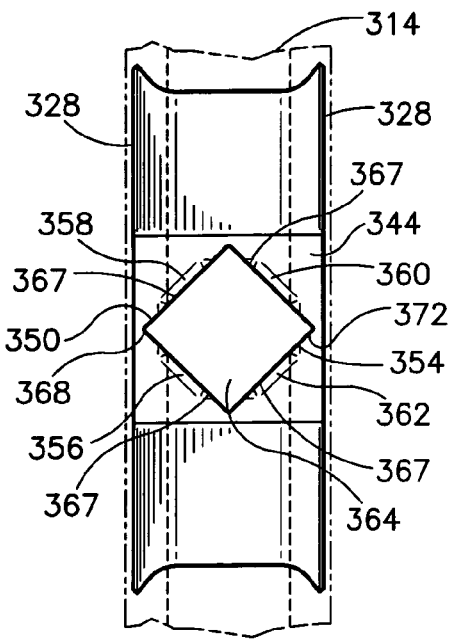
FIG. 14 is an elevational view taken from the top of the connector device shown in FIG. 11 with the strut shown in phantom in the same plane as the band.
Figure 15:
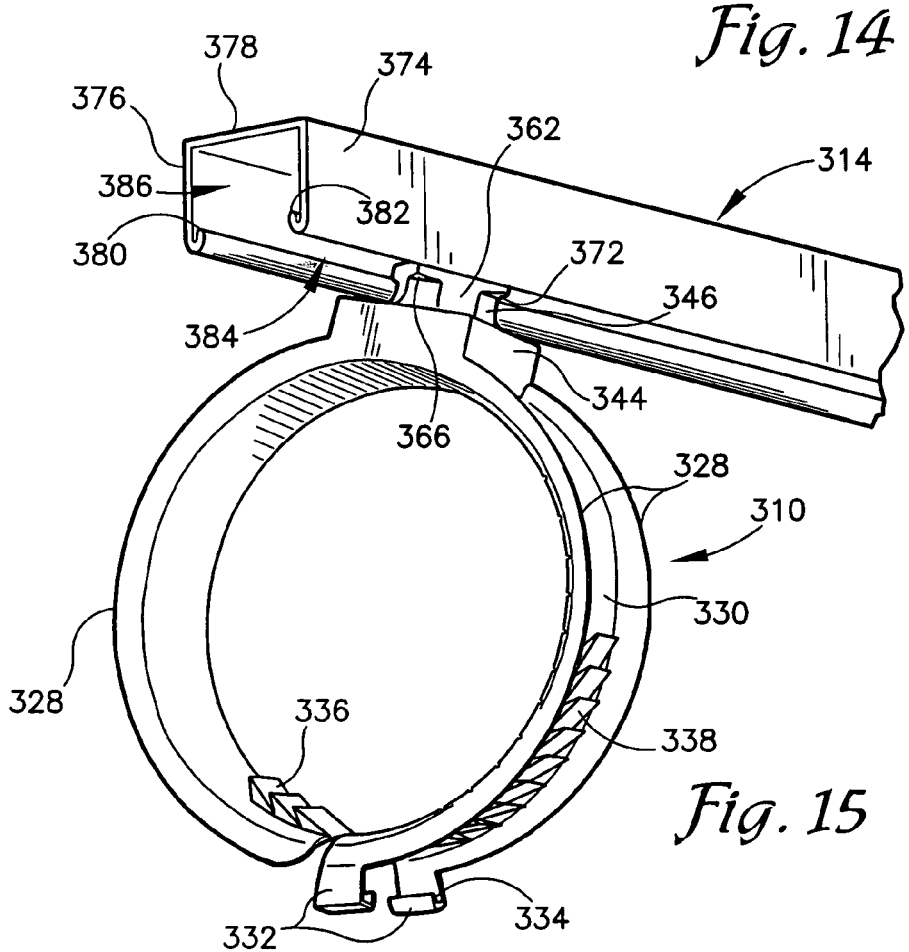
FIG. 15 is a perspective view of the connector device shown in FIG. 11 during installation in a channel strut and with the clearance facets of the key plate aligned parallel with the side walls of the strut channel.

As best shown in FIG. 14, the illustrated neck 346 is surmounted by a generally square or diamond shaped key plate 363 having an upper surface 364 and a lower surface 365 (FIG. 13) and outer sides 367. Each of the sides 367 of the key plate 363 merges with a respective clearance facet of the neck 346 to form a generally T-shaped clearance surface that extends between the top of the boss 344 to the top of the key plate 363. The illustrated corners of the key plate 363 extend beyond their respective relief facets 348, 350, 352, 354 in overhanging relation to form four outstanding triangular tabs or support shoulders 366, 368, 370, 372 (FIG. 13).

The device 310 is particularly designed for mounting in suspended relation to a structure such as a channel strut 314 as shown in FIGS. 10 and 15. The illustrated channel strut 314 is of conventional construction and may be formed of steel, stainless steel, aluminum, fiberglass or any other suitable material. The channel strut 314 typically includes a pair of flanges or sidewalls 374 and 376 having corresponding inner faces connected by a web or back wall 378. The open edges of the flanges 374 and 376 are inturned toward the web 378, as by rolling or hemming, to form a pair of strut or hem shoulders 380 and 382 which define a longitudinal opening or slot 384. It is foreseen that the channel strut 314 could alternatively be formed by other means, such as by extrusion. In this manner, the hem shoulders 380 and 382 define a longitudinally opening or slot 384 into a channel 386 defined by the walls 374, 376 and 378. Because of the width of the channel occupied by the hem shoulders 380 and 382, the slot 384 is necessarily somewhat narrower than the channel 386, so that the overall configuration of the combined slot and channel is approximately T-shaped when viewed in cross section. Although the channel strut 314 is generally installed in a structure so that the slot 384 opens downwardly as depicted in FIGS. 10 and 15, it is foreseen that the strut may also be installed so that the slot 384 opens laterally, or from the top.

The sides 367 of the key plate 363 align with the clearance facets 356, 368, 360 and 362 of the neck 346, and the key plate 363 is sized so that these facets can be oriented to pass through the slot 384. The support shoulders 366, 368, 370 and 372 of the key plate 363 extend beyond and overhang the relief facets 348, 350, 352 and 354 of the neck, and the key plate 363 is sized so that the support shoulders can be oriented for reception within the channel 386, but can also be oriented to rest on the slot hem shoulders 380 and 382.

The channel engagement structure or key 326 is preferably of unitary construction, although it is foreseen that one or more of the boss 344, neck 346 and key plate 363 could be fabricated individually and joined together using a fastener prior to use. As long as the widest aspect of the key plate 363 is wider than the slot 384 of the channel strut 314 but narrower than the channel 386, and the narrowest aspect of the key plate 363 is narrower than the slot 384, the key plate 363 may have any suitable geometric configuration, such as the generally square shape depicted in FIGS. 13 and 14. The tilted square shape of the illustrated key plate 363 is particularly practical for the purpose of the device 310. The shape of the key plate 363 can also be described as a diamond, a rhombus, an equilateral quadrilateral, or a parallelogram. It is also foreseen that the key plate could be configured to have any polyhedral shape, such as, for example, a diamond, hexagon, or octagon shape. The key plate 363 could also have a curvate or rounded shape, such as an oval or shamrock. Similarly, while the neck 346 is depicted in FIGS. 13 and 14 to have a generally octagonal cross section, it also may be configured to have any polyhedral shape with equal or unequal sides and or it may be curved. It is also foreseen that the clearance facets 356, 258, 360, 362 need not extend to the margins of the key plate 363. Instead, the area of the neck between the respective relief facets may be axially recessed inwardly toward the centerline of the neck 346 and they may also be curved as well as planar.

In use, the device 310 is grasped and positioned in proximity to a preselected location along a channel strut 314. The user next positions the key 326 so that two sides 367 of the key plate 363 with their continguous but opposite clearance facets 356 and 360 or 358 and 362 (FIG. 15) are aligned with the slot 384 of the strut 314 and in parallel relation. Since the width of the channel slot 384 exceeds the width of the key plate 363 between opposed clearance facets 356 and 360 as well as between facets 358 and 362, the user is able to push the key plate 363 upwardly through the slot 384 and into the channel 386. FIG. 14 shows the facets 358 and 362 aligned parallel to the slot 384.

The user next twists or rotates the key so that the key plate 363 is rotated clockwise about 45° in an action similar to engagement of a bayonet fitting, urging the key plate support shoulders 368 and 372 over the respective slot hem shoulders 380 and 382 until the key plate 363 is positioned as shown in FIG. 14. In this manner, the key support shoulders 368 and 372 rest on respective slot shoulders 380 and 382 to support the device 310 in dependent relation to the channel strut 314. The relief facets 350 and 354 and rolled slot shoulders 380 cooperatively serve as stops to prevent lateral shifting of the key plate 363 that might cause the key support shoulders 368 and 372 to slide off the slot hem shoulders 380 and 382. The key plate 363 may also be sized to have a depth just slightly more than sufficient to clear the distance between the tops of the slot shoulders and the inner surface of the strut backwall 378 so that there is sufficient clearance for the key plate 363 to slide easily along the slot hem shoulders 380 and 382 but not excessive clearance that could permit the key plate 363 to be accidentally dislodged upwardly off the slot shoulders.

The installation as described places the device 310 with the band 316 in parallel or longitudinal orientation with respect to the strut 314, and with the generally circular opening formed by the band 316 longitudinally aligned with the channel 386 as shown in FIG. 10. If it is desirable to position the device in the transverse orientation with the circular opening transverse to the strut 314, the user can alternatively twist or rotate the device counterclockwise about 90°, urging the key plate support shoulders 370 and 366 over the respective slot hem shoulders 380 and 382 until the key plate 363 is positioned as shown in FIG. 14. Once the device 310 has been rotated either clockwise or counterclockwise into an engagement position with the slot shoulders 380 and 382, the user may continue rotation in the same direction to reverse the device 310. In this manner, the head and tail ends 318 and 320 may be reversed, for example to accommodate a tight side clearance, without changing the parallel or transverse orientation of the cables 312.

Those skilled in the art will appreciate that the direction of rotation required to achieve the desired orientation of the opening defined by the band 316 will depend on the whether the initial orientation aligns clearance facets 358 and 362 or facets 352 with the slot 384. Similarly, while the band 316 is depicted in FIGS. 10-12 and 15 with the head end 318 on the left and the tail end 320 including the guides 332 on the right, such orientation is a choice of use that may be differed to accommodate handedness of the operator, available clearance or any other consideration. The device 310 may be mounted in dependent relation to a channel strut 314 or it may be mounted atop a channel, for supporting a run of pipes or cables 312 in spaced relation to a floor or other support surface or it may be mounted to project sideways from a channel that is attached to a wall or spans an open area between a pair of walls.

Once the device 310 is installed in the channel 386, the user positions the cables 312 to be bundled adjacent the device 310 and urges the cables against the tie, causing the more flexible tail end 329 to deflect inwardly, enlarging the opening and permitting the cables to pass between the ends 328 and 320 and into the interior of the band 316. Depending on whether the device 310 is installed in dependent, superior or lateral relation to the channel 386 and also whether the channel engagement structure 326 is positioned approximately midway between the head and tail ends 318 and 320 or adjacent one of the ends, it may be necessary for the user to urge the cables upwardly, downwardly, laterally against the tie until they are encircled by the band 316. The user next squeezes the outer surface of the band 316 substantially as previously described, causing the head end 318 bearing the inner pawl teeth 336 to overlap the tail end 320 bearing the outer ratchet teeth 338 and also causing the guides 332 forming the keeper 335 to snap over the rims 328 adjacent the head end 318 to bring the teeth 336 and 338 into mating engagement. The user may continue to exert circumferential pressure on the band 316 to snug it against the bundled cables 312. Alternatively, when the cables are encircled, the user may thread the head end 318 of the band 316 through the keeper 335 and continue to squeeze the band 316 causing the band rims 328 to travel through the guide slots 334, until the head end 318 is slid into overlapping relation with the tail end 320 and the outer ratchet teeth 338 engage the inner pawl teeth 336.

A user may unclasp the tie 311 substantially as previously described by squeezing to release the engaged teeth 336 and 338. If necessary, the head and tail end 318 and 320 may be manually urged apart to release the head end 318 from the guides 332. Once the tie 311 is unclasped, the cables can be pulled downwardly and outwardly past the ends 318 and 320. The device 310 can then be removed from the channel strut 314 by reversing the twisting and alignment actions previously described. Alternatively, once twisted into a released position in which the relief facets are aligned with the channel 386, the key 326 can be slid along the channel 386 to a new location where it is again twisted into place.

In this manner, the strut mounted support device 310 can be positioned so that the cables or pipes extend either parallel or transverse to the channel strut 314. Advantageously, the device can be installed, released for repositioning along the length of the strut 314 or for rotation 90°, 180° or 270° by hand, released for addition of cables or removed entirely by a user in an entirely one-handed operation and without the need for tools.

While the keyed channel strut mounted support device 310 has principally been described and illustrated in association with the band or tie 311 for supporting elongated members such as cables or pipes 312, it is foreseen that the keyed channel engagement structure 326 could also be applied to releasably connect other types of members to slotted elements such as the channel strut 314.

It is to be understood that while certain forms of the invention have been illustrated and described herein, it is not intended to be limited to the specific forms or arrangement of parts described and shown.

The invention claimed is:

1. A connector device for connecting a supported member to a support structure including spaced apart shoulders defining a slot, said device comprising:
   (a) an attachment structure configured to enable attachment to a supported member;
   (b) a slot engagement structure connected to said attachment structure and including:
      (1) a key plate sized in a first dimension to enable reception through a slot of a support structure and sized in a second dimension to enable engagement of said plate with shoulders defining the slot; and
      (2) an octagonal neck connecting said key plate in spaced relation to said attachment structure, said neck being sized no larger than said key plate in said first dimension and sized less than said key plate in said second dimension;
   (c) said key plate and said neck cooperating in such a manner as to enable insertion of said key plate through the slot with said key plate oriented to position said first dimension across the slot and enabling engagement of said key plate with the shoulders by rotation of said key plate to position said second dimension across the slot to thereby connect said connector device to the support structure;
   (d) first and second pairs of opposite clearance facets connected with said opposite sides of said key plate; and
   (e) first and second pairs of opposite relief facets connected with said opposite corners of said key plate.

2. The connector device as set forth in claim 1, wherein said attachment structure includes:
   (a) an elongated band formed of a flexible material and having a head end and a tail end, an inner surface and an outer surface;
   (b) teeth formed along a portion of said inner surface at said head end and teeth formed along a portion of said outer surface at said tail end; and
   (c) said teeth cooperating for mutual releasable engagement in a circumferential direction to form a band opening for securing said band in surrounding relation about said elongated members with a selected degree of tightening.

3. The connector device as set forth in claim 2, wherein:
   (a) said head end of said band includes a keeper for receiving said tail end therethrough.

4. The connector device as set forth in claim 3, wherein:
   (a) said tail end of said band includes a pair of upstanding rims; and
   (b) said keeper includes a pair of guides, each guide receiving a respective rim therethrough.

5. The tie device as set forth in claim 1, wherein said key plate has a diamond shape.

6. A connector device for connecting a supported member to a support structure including spaced apart shoulders defining a slot, said device comprising:
   (a) an attachment structure configured to enable attachment to a supported member;
   (b) a slot engagement structure connected to said attachment structure and including:
      (1) a key plate sized in a first dimension to enable reception through a slot of a support structure and sized in a second dimension to enable engagement of said plate with shoulders defining the slot; and
      (2) a neck connecting said key plate in spaced relation to said attachment structure, said neck being sized no larger than said key plate in said first dimension and sized less than said key plate in said second dimension;
   (c) said key plate and said neck cooperating in such a manner as to enable insertion of said key plate through the slot with said key plate oriented to position said first dimension across the slot and enabling engagement of said key plate with the shoulders by rotation of said key plate to position said second dimension across the slot to thereby connect said connector device to the support structure; and
   (d) wherein said key plate has a square shape which is positioned with either diagonal of the shape transverse to the channel strut when received therein.

7. The connector device as set forth in claim 6, wherein said attachment structure includes:
   (a) an elongated band formed of a flexible material and having a head end and a tail end, an inner surface and an outer surface;
   (b) teeth formed along a portion of said inner surface at said head end and teeth formed along a portion of said outer surface at said tail end; and
   (c) said teeth cooperating for mutual releasable engagement in a circumferential direction to form a band opening for securing said band in surrounding relation about said elongated members with a selected degree of tightening.

8. The connector device as set forth in claim 7, wherein:
   (a) said head end of said band includes a keeper for receiving said tail end therethrough.

9. The connector device as set forth in claim 8, wherein:
   (a) said tail end of said band includes a pair of upstanding rims; and
   (b) said keeper includes a pair of guides, each guide receiving a respective rim therethrough.

10. A connector device for connecting an elongated member to a channel strut including flanges with inwardly turned rims forming shoulders spaced apart across a slot, said device comprising:
    (a) an attachment structure configured to enable attachment to an elongated member;
    (b) a channel engagement structure connected to said attachment structure and including:
       (1) a key plate having pairs of opposite sides and pairs of opposite corners;
       (2) an octagonal neck connecting said key plate in spaced relation to said attachment structure, said neck being of such a cross sectional size and share that said neck is no larger than a first distance between a pair of said opposite sides of said key plate and such that said neck is smaller than a second distance between a pair of said opposite corners of said key plate;
    (c) said key plate and said neck cooperating in such a manner as to enable insertion of said key plate through the slot with said key plate oriented to align a pair of said sides of said key plate with the slot and enabling engagement of said corners of said key plate with the shoulders by rotation of said key plate to thereby connect said connector device to the channel strut;
    (d) first and second pairs of opposite clearance facets connected with said opposite sides of said key plate; and
    (e) first and second pairs of opposite relief facets connected with said opposite corners of said key plate.

11. The connector device as set forth in claim 10, wherein said attachment structure includes:
    (a) an elongated band formed of a flexible material and having a head end and a tail end, an inner surface and an outer surface;
    (b) teeth formed along a portion of said inner surface at said head end and teeth formed along a portion of said outer surface at said tail end; and
    (c) said teeth cooperating for mutual releasable engagement in a circumferential direction to form a band opening for securing said band in surrounding relation about said elongated members with a selected degree of tightening.

12. The connector device as set forth in claim 11, wherein:
    (a) said head end of said band includes a keeper for receiving said tail end therethrough.

13. The connector device as set forth in claim 12, wherein:
    (a) said tail end of said band includes a pair of upstanding rims; and
    (b) said keeper includes a pair of guides, each guide receiving a respective rim therethrough.

14. A connector device for connecting an elongated member to a channel strut including flanges with inwardly turned rims forming shoulders spaced apart across a slot, said device comprising:
    (a) an attachment structure configured to enable attachment to an elongated member;
    (b) a channel engagement structure connected to said attachment structure and including:
       (1) a key plate having pairs of opposite sides and pairs of opposite corners;
       (2) a neck connecting said key plate in spaced relation to said attachment structure, said neck being of such a cross sectional size and shape that said neck is no larger than a first distance between a pair of said opposite sides of said key plate and such that said neck is smaller than a second distance between a pair of said opposite corners of said key plate;
    (c) said key plate and said neck cooperating in such a manner as to enable insertion of said key plate through the slot with said key plate oriented to align a pair of said sides of said key plate with the slot and enabling engagement of said corners of said key plate with the shoulders by rotation of said key plate to thereby connect said connector device to the channel strut; and
    (d) wherein said key plate has a square shape which is positioned with either diagonal of the shape transverse to the channel strut when received therein.

15. The connector device as set forth in claim 14, wherein said attachment structure includes:
    (a) an elongated band formed of a flexible material and having a head end and a tail end, an inner surface and an outer surface;
    (b) teeth formed along a portion of said inner surface at said head end and teeth formed along a portion of said outer surface at said tail end; and (c) said teeth cooperating for mutual releasable engagement in a circumferential direction to form a band opening for securing said band in surrounding relation about said elongated members with a selected degree of tightening.

16. The connector device as set forth in claim 15, wherein:
(a) said head end of said band includes a keeper for receiving said tail end therethrough.

17. The connector device as set forth in claim 16, wherein:
(a) said tail end of said band includes a pair of upstanding rims; and
(b) said keeper includes a pair of guides, each guide receiving a respective rim therethrough.

18. A tie device in combination with a channel strut having a pair of spaced apart support shoulders defining a channel for mounting said tie device on said support shoulders and within said channel for securing said tie device about an elongated member, said device comprising:
(a) an elongated band formed in an annular configuration of a flexible material and having a head end, a tail end, an inner surface and an outer surface;
(b) teeth formed along a portion of said inner surface at said head end and teeth formed along a portion of said outer surface at said tail end, said teeth cooperating for mutual releasable engagement in a circumferential direction to form a band opening for securing said band in surrounding relation about said elongated member with a selected degree of tightening;
(c) a boss extending from said outer surface of said band;
(d) a key plate positioned on said boss and cooperating with said boss to form pairs of opposite key grooves;
(e) said key plate sized in first and second dimensions to enable reception between said support shoulders of said channel to enable insertion of said key plate between said support shoulders and turning of said key plate to engage said key grooves with said shoulders in a first direction with said band opening parallel to said channel, and turning of said key plate to engage said key grooves with said shoulders in a second direction with said band opening transverse to said channel; and
(f) wherein said key plate has a square shape.

19. The tie device as set forth in claim 18, wherein:
(a) said head end of said band includes a keeper for receiving said tail end therethrough and retaining said band teeth in engagement.

20. The connector device as set forth in claim 18, wherein:
(a) said tail end of said band includes a pair of upstanding rims; and
(b) said keeper includes a pair of guides, each guide receiving a respective rim therethrough.

21. The connector device as set forth in claim 18, wherein:
(a) said boss has a square shape.

\* \* \* \* \*

UNITED STATES PATENT AND TRADEMARK OFFICE
CERTIFICATE OF CORRECTION

| | | |
|---|---|---|
| PATENT NO. | : 7,661,634 B2 | Page 1 of 1 |
| APPLICATION NO. | : 11/645874 | |
| DATED | : February 16, 2010 | |
| INVENTOR(S) | : A. Dean Thompson | |

It is certified that error appears in the above-identified patent and that said Letters Patent is hereby corrected as shown below:

Claim 10, paragraph (b), should read as follows:

(b) a channel engagement structure connected to said attachment structure and including: (1) a key plate having pairs of opposite sides and pairs of opposite corners; (2) an octagonal neck connecting said key plate in spaced relation to said attachment structure, said neck being of such a cross sectional size and shape that said neck is no larger than a first distance between a pair of said opposite sides of said key plate and such that said neck is smaller than a second distance between a pair of said opposite corners of said key plate;

Specifically, in claim 10, paragraph (b)(2), line 3, the word "share" should read as "shape".

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO.        : 7,661,634 B2                                                  Page 1 of 1
APPLICATION NO.   : 11/645874
DATED             : February 16, 2010
INVENTOR(S)       : A. Dean Thompson It is certified that error appears in the above-identified patent and that said Letters Patent is hereby corrected as shown below:

Column 13, lines 57-67 (claim 10, paragraph (b)), should read as follows:

(b) a channel engagement structure connected to said attachment structure and including: (1) a key plate having pairs of opposite sides and pairs of opposite corners; (2) an octagonal neck connecting said key plate in spaced relation to said attachment structure, said neck being of such a cross sectional size and shape that said neck is no larger than a first distance between a pair of said opposite sides of said key plate and such that said neck is smaller than a second distance between a pair of said opposite corners of said key plate;

Specifically, Column 13, line 63 (claim 10, paragraph (b)(2), line 3), the word "share" should read as "shape".

This certificate supersedes the Certificate of Correction issued August 10, 2010.

Signed and Sealed this

Thirty-first Day of August, 2010

David J. Kappos
*Director of the United States Patent and Trademark Office*